(12) United States Patent
Suzuki et al.

(10) Patent No.: US 8,697,253 B2
(45) Date of Patent: *Apr. 15, 2014

(54) HIGH-STRENGTH QUENCHED FORMED BODY WITH GOOD CORROSION RESISTANCE

(75) Inventors: Shinichi Suzuki, Toukai (JP); Toshimasa Tomokiyo, Toukai (JP); Shuuji Souma, Toukai (JP); Katsuji Nakashima, Toyota (JP); Masashi Ozawa, Toyota (JP); Kiyohito Kondou, Toyota (JP)

(73) Assignees: Aisin Takaoka Co., Ltd., Toyota-shi (JP); Nippon Steel & Sumitomo Metal Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,182

(22) Filed: Jan. 24, 2011

(65) Prior Publication Data

US 2011/0117382 A1     May 19, 2011

Related U.S. Application Data

(62) Division of application No. 11/631,965, filed as application No. PCT/JP2005/013106 on Jul. 8, 2005, now Pat. No. 7,892,605.

(30) Foreign Application Priority Data

Jul. 9, 2004  (JP) .................................. 2004-203544

(51) Int. Cl.
*B32B 15/04* (2006.01)
*B32B 15/18* (2006.01)
*B32B 15/20* (2006.01)

(52) U.S. Cl.
USPC ........... 428/659; 428/684; 428/685; 428/341; 428/632; 428/633

(58) Field of Classification Search
USPC ......... 428/658, 659, 684, 685, 332, 334, 335, 428/336, 340, 341, 628, 629, 630, 631, 632, 428/633
See application file for complete search history.

(56) References Cited

U.S. PATENT DOCUMENTS

| | | | |
|---|---|---|---|
| 6,709,770 B2 * | 3/2004 | Komatsu et al. | ............. 428/659 |
| 8,133,544 B2 * | 3/2012 | Suzuki et al. | ............. 427/398.3 |
| 2004/0166360 A1 | 8/2004 | Imai et al. | |
| 2010/0326570 A1 | 12/2010 | Suzuki et al. | |

FOREIGN PATENT DOCUMENTS

| | | |
|---|---|---|
| JP | 61-127849 | 6/1986 |
| JP | 7-26360 | 1/1995 |
| JP | 7-292452 | 11/1995 |
| JP | 8-176778 | 7/1996 |
| JP | 2000-248338 | 9/2000 |
| JP | 2000 248350 | 9/2000 |
| JP | 2001 353548 | 12/2001 |
| JP | 2002-363721 | * 12/2002 |
| JP | 2003 73774 | 3/2003 |
| JP | 2003-105513 | 4/2003 |
| JP | 2003 126920 | 5/2003 |
| JP | 2003 126921 | 5/2003 |
| JP | 2003-147499 | 5/2003 |
| WO | WO 03/035922 | 5/2003 |

OTHER PUBLICATIONS

Machine Translation, Izumitani et al., JP 2002-363721, Dec. 2002.*

* cited by examiner

*Primary Examiner* — Michael E La Villa
(74) *Attorney, Agent, or Firm* — Oblon, Spivak, McClelland, Maier & Neustadt, L.L.P.

(57) ABSTRACT

The high-strength quenched formed body contains a layer, in which Zn is a major component and which is formed of Fe: 30% by mass or less, in an amount of 30 g/m² or more on the surface of an after-quenching formed-body steel material, and accordingly is good in corrosion resistance. A quenched formed body is produced by quenching a zinc-plated steel material, which includes a zinc-plated layer which contains each of Al and Si having alloying-retarding function and readily-oxidizing function independently or compositely, in an amount of 0.15% by mass or more, after heating it to 800° C. or more and 950° C. or less in an oxidizing atmosphere of oxygen: 0.1% by volume or more.

6 Claims, 4 Drawing Sheets

Comp. Ex. No.10(Non-quenched)

HIGH-STRENGTH QUENCHED FORMED BODY WITH GOOD CORROSION RESISTANCE

The present application is a Divisional Application of Ser. No. 11/631,965, now U.S. Pat. No. 7,892,605, having a filing date of Jan. 9, 2007, which is a '371 of PCT/JP 05/13106 having a filing date of Jul. 8, 2005.

TECHNICAL FIELD

The present invention relates to a formed body, which is good in terms of the corrosion resistance and which is completed by performing a quenching process for the purpose of highly strengthening it, and a process for producing the formed body.

BACKGROUND ART

Recently, for the purpose of automotive lightening and safety improvement, it has been getting under way to highly strengthen automobile component parts and raw materials employed for the same. Steel plates, one of the representative examples, too, are such that the employment ratio of high-strength steel plates has about come to heighten. However, because of the fact that high-strength steel plates are of high strength and are hard in general, the degree of forming freedom is small in the press formability; moreover, there are such problems that the configurational freezability of pressed products is poor, the dimensional accuracy of formed products is defective and the longevity of pressing dies is short. Against these assignments, the improvements, which begin with the raw materials, have been getting under way as well. Recently, for the purpose of obtaining much-higher-strength component parts while providing them with good configurational accuracy, hot-working or hot-pressing technologies have become widespread, hot-working or hot-pressing technologies in which a steel plate is heated to 800° C. or more to soften it, is cooled rapidly simultaneously with press forming, and is quenched to make a high-strength component part; moreover, cold working-quenching technologies have come to be employed as an industrial technology, cold working-quenching technologies in which it is similarly quenched to make a high-strength component part after it is cold worked.

Meanwhile, since industrial machines, which are represented by automobiles, are such that the corrosion resistance in service environments is required sufficiently, components has been employed currently, component parts which are made by cold forming zinc-based plated steel plates, which are low cost and are good in terms of the corrosion resistance; however, in addition to this, many inventions have been known publicly, inventions in which surface-treated steel materials are heated to quench them.

In Patent Literature No. 1, a production method for a high-strength formed component part is disclosed, high-strength formed component part in which a zinc or zinc-alloy coating film is formed in a thickness of 5 µm-30 µm on a steel plate so that the protection against corrosion and decarburization, and the lubricational function are secured. In Patent Literature No. 2, a steel plate for hot pressing is disclosed, steel plate in which a barrier layer, which inhibits the volatilization of zinc upon heating, is formed on a zinc-plated layer before heating for quenching treatment. In Patent Literature No. 3, a hot-pressing method for a zinc-system-plated steel plate is disclosed. In Patent Literature No. 4, a hot-pressed formed product in which an iron-zinc solid-solution layer exists is disclosed.

However, in accordance with these methods, although all of them are better in terms of the corrosion than that of molded products, which are made by subjecting plating-free iron to quenching treatment, the corrosion resistance is still insufficient compared with that of molded products, which are made of plated steel plates being formed by ordinary cold working. It is because zinc volatilizes by means of heating. Against this problem, although aluminum-plated steel plates have been employed for applications in which the corrosion resistance, being equivalent to that of ordinary plated steel plates, is required, not only their costs are high but also the after-quenching corrosion resistance lowers more than that of cold-formed members none the less.

In accordance with aforementioned Patent Literature No. 2, before the quenching treatment, a barrier layer, which comprises an oxidized coating film, is formed on the zinc-plated layer of the steel material. In this case, when heating the steel material to a quenching temperature, or when heating it to the quenching temperature and holding it thereat, there is a fear that cracks might generate in the zinc-plated layer considerably because of the thermal expansion difference between the barrier layer, which has been formed originally on the steel material, and the zinc-plated layer. In this case, due to the cracks, the fear that the volatilization amount of zinc increases is highly likely, and it is not necessarily sufficient in order to obtain a plated layer whose corrosion resistance is good after the quenching treatment.

Against these problems, a technique has been desired strongly, technique which makes it possible to highly strengthen quenching and improve corrosion resistance in zinc-system-plated steel materials, which are more predominant in view of cost.

Patent Literature No. 1: Japanese Unexamined Patent Publication Gazette (KOKAI) No. 2001-353,548

Patent Literature No. 2: Japanese Unexamined Patent Publication Gazette (KOKAI) No. 2003-73,774

Patent Literature No. 3: Japanese Unexamined Patent Publication Gazette (KOKAI) No. 2003-126,920

Patent Literature No. 4: Japanese Unexamined Patent Publication Gazette (KOKAI) No. 2003-126,921

The present invention, in view of the aforementioned problems, is for providing a high-strength quenched formed body, which is good in corrosion resistance, in formed-body steel materials, to which the zinc-system-plated steel material, being predominant cost-wise, is performed and in which the corrosion resistance of after-quenching formed-body steel material is made equivalent to or more than that of cold-formed product, and a production process for the same.

DISCLOSURE OF THE INVENTION

The present inventors, first of all, investigated earnestly the causes of why the corrosion resistance of the zinc-system-plated steel material is inferior to that of ordinary zinc plated steel material, for instance, that of alloyed molten zinc plated steel material, after the hot working at 800° C. or more being required for quenching it. As a result, they reached the conclusion that the cause of why the corrosion resistance is poor is not only because Zn volatilizes so that the plated amount decreases but also because Zn, which constitutes the zinc-plated layer, solves into Fe so that Fe turns into an Fe—Zn alloy layer, in which Fe is a major component. Namely, an ordinary zinc-plated steel material is such that the corrosion resistance is demonstrated more by means of the effect that Zn, which is oxidized upon corrosion, turns into a dense protective film than by means of the sacrifice corrosion prevention. However, since the zinc-system-plated steel material, which is hot worked at 800° C. or more, is such that an Fe—Zn alloy layer whose Fe % is great is formed, the corrosion resistance is not demonstrated, though the Zn content is present more superfluously quantitatively in the steel-material surface than it is in an ordinary zinc-system-plated steel material. They considered that this is because of the fact that an Fe—Zn alloy layer, which is generated by means of quenching, is such that Fe becomes a major component, and thereby the oxidized film of Zn cannot become a dense film due to the volumetric expansion of Fe, which is oxidized upon quenching. Therefore, the present inventors arrived at completing the present invention based on the view that, in order to have the corrosion resistance demonstrated, it is more important that a Zn—Fe alloy layer, in which Zn is a major component so that the quality is good (Fe % is less), is present sufficiently in view of quantity as well.

A high-strength quenched formed body of the present invention according to a first aspect, high-strength quenched body which is good in corrosion resistance, is characterized in that it comprises an after-quenching formed-body steel material; and a layer being disposed on the surface of the formed-body steel material, the layer being subjected to a quenching treatment along with the formed-body steel material, the layer being made from Zn as a major component, and the layer being formed of Fe: 30% by mass or less; and the layer, in which Zn is a major component and which is formed of Fe: 30% by mass or less, is contained in an amount of 30 g/m$^2$ or more. Note that the % in the present description means % by mass.

Here, the phrase, "Fe: 30% by mass," means Fe % in such an instance that the layer is taken as 100% by mass. "m$^2$" means per 1 m$^2$, the unit surface area of the formed-body steel material.

The "layer in which Zn is a major component and which is formed of Fe: 30% by mass or less" is a layer in which Fe is less but Zn is more, and has high corrosion resistance. Even when a zinc-plated layer undergoes a quenching treatment along with a formed-body steel material, as far as the "layer in which Zn is a major component and which is formed of Fe: 30% by mass or less" is present in a predetermined value (30 g/m$^2$) or more, the corrosion resistance of the quenched formed body becomes satisfactory.

A process of the present invention according to a second aspect of the present invention for producing a high-strength quenched formed body, which is good in corrosion resistance, is characterized in that the following are performed sequentially: a step of preparing a formed-body steel material, on which a zinc-plated layer is coated, zinc-plated layer which contains each of Al and Si, which have alloying-retarding function and readily-oxidizing function, independently or compositely in an amount of 0.15% by mass or more; and a step of quenching the formed-body steel material after heating it to 800° C. or more and 950° C. or less in an oxidizing atmosphere of oxygen: 0.1% by volume or more, thereby producing:

a high-strength quenched formed body comprising: an after-quenching formed-body steel material; and a layer being disposed on the surface of the formed-body steel material, the layer being subjected to a quenching treatment along with the formed-body steel material, the layer being made from Zn as a major component, and the layer being formed of Fe: 30% by mass or less; and the layer, in which Zn is a major component and which is formed of Fe: 30% by mass or less, is contained in an amount of 30 g/m$^2$ or more.

Here, the phrase, "0.15% by mass or more," means the amount of readily-oxidizing element (Al and/or Si) in such an instance that the before-quenching zinc-plated layer is taken as 100% by mass.

Usually, in 800-° C.-or-more hot working, since Zn has a sufficient vapor pressure, and since it vaporizes off within a heating furnace, the Zn amount of zinc-plated layer is less likely to be maintained. Hence, in a before-heating zinc-plated layer upon quenching, by having the readily-oxidizing element (Al and/or Si) contained in an amount of 0.15% by mass or more in the before-quenching-treatment zinc-plated layer, and by making the furnace's inside an oxidizing atmosphere in which 0.1%-by-volume-or-more oxygen is present, the readily-oxidizing element is oxidized continuously in the surface of the zinc-plated layer while suppressing the volumetric change resulting from heating, and accordingly it is possible to form a dense oxidized film. Consequently, even when heating it for quenching in a heating temperature range of the quenching temperature region (800° C. or more and 950° C. or less), the suppression of the volatilization of Zn in the zinc-plated layer becomes possible.

In accordance with the method of the present invention like this, since oxides grow gradually in the zinc-plated layer along with the initiation of heating for quenching treatment, the volatilization of zinc is suppressed. Accordingly, after the quenching treatment, the "layer in which Zn is a major component and which is formed of Fe: 30% by mass or less" can be obtained in a predetermined value (30 g/m$^2$ or more) satisfactorily, and thereby the corrosion resistance can be secured.

By the way, it is possible as well to think of a measure of forming a barrier layer, which is made of an oxidized film, on the zinc-plated layer of steel material. However, in this case, when heating a steel material to a quenching temperature, or when heating it to the quenching temperature and holding it thereat, there is a fear that cracks might generate in the zinc-plated layer considerably because of the thermal expansion difference between the barrier layer, which is formed originally on the steel material, and the zinc-plated layer. In this case, due to the cracks, the fear that the volatilization amount of zinc increases is highly likely. Therefore, it is inferred that, after the quenching treatment, it is not sufficient in order to obtain the layer whose corrosion resistance is good (layer in which Zn is a major component and which is formed of Fe: 30% by mass or less) in the zinc-plated layer.

Effect of the Invention

In accordance with the present invention, it is possible to maintain the zinc content in the zinc-plated layer abundantly even when being subjected to quenching treatments. Accordingly, after-quenching formed-body component parts are made so that the corrosion resistance, which is equal to or more than that of zinc-system-plated steel materials for cold-worked molded products, zinc-system-plated steel materials which have been employed in automobiles or industrial machines conventionally, can be obtained, and additionally the dimensional accuracy of high-strength component parts can be improved remarkably, too. Therefore, it becomes possible to advantageously push forward the weight saving, safety improvement and rust-prevention improvement of automobiles and industrial machines, and accordingly the industrial contribution is great extremely.

BEST MODE FOR CARRYING OUT THE INVENTION

A high-strength quenched formed body of the present invention comprises an after-quenching formed-body steel material, and a layer being disposed on the surface of the formed-body steel material, the layer being subjected to a quenching treatment along with the formed-body steel material, the layer being made from Zn as a major component, and the layer being formed of Fe: 30% by mass or less. The "layer in which Zn is a major component and which is formed of Fe: 30% by mass or less" is such that the corrosion resistance is good, and is contained in an amount of 30 g/m$^2$ or more.

Here, in the "layer in which Zn is a major component and which is formed of Fe: 30% by mass or less," when the layer is taken as 100% by mass, Zn can preferably be contained in an amount of 70% by mass or more, 80% by mass or more, or 90% by mass or more. Even when undergoing a quenching treatment, if the plated layer is Zn-rich, high corrosion resistance can be secured.

The high-strength quenched formed body of the present invention, which is good in corrosion resistance, can be obtained by heating a zinc-plated steel material, which comprises a zinc-plated layer which contains each of Al and Si, which have alloying-retarding function and readily-oxidizing function, in an amount of 0.15% by mass or more independently or compositely in an oxidizing atmosphere of oxygen: 0.1% by volume or more in a temperature rage of 800° C. or more and 950° C. or less while adjusting the heating time appropriately; and thereafter quenching it. As for the oxidizing atmosphere, it is possible to exemplify oxygen: 0.1% by volume or more, oxygen: 1% by volume or more, or oxygen: 20% by volume or more.

Moreover, prior to the heating upon quenching, when the zinc-plated layer is taken as 100% by mass, the zinc-plated layer contains each of the elements, Al and Si, independently or compositely in an amount of 0.15% by mass or more. It is preferable as well to contain Mg, Ti or a rare-earth element (Ce) as a readily-oxidizing element. Here, the element, which has alloying-retarding function, means an element, which retards iron, constituting the base metal of steel material, from diffusing into the zinc-plated layer. In this case, since the iron of steel material is retarded from diffusing into the zinc-plated layer, it is possible to lower the iron % in the zinc-plated layer. Moreover, the readily-oxidizing element means an element, which is likely to generate an oxidized film. Note that, since Al and Si are readily-oxidizing elements and simultaneously alloying-retarding elements, they can demonstrate both functions, the readily-oxidizing function and the alloying-retarding function. Note that, when Al and Si are excessive, the Zn amount in the plated layer decreases relatively.

Here, when Al and Si are contained independently or compositely in the aforementioned before-quenching-treatment plated layer, it is possible to exemplify 0.16% by mass or more, 0.18% by mass or more, 0.20% by mass or more, 0.30% by mass or more, 0.40% by mass or more, 0.60% by mass or more, and the like, as for the lower limit value. As for the upper limit value of the aforementioned elements (Al, and Si) which are combinable with those lower limit values, it is possible to exemplify 3% by mass or less, 4.5% by mass or less, 4.7% by mass or less, 4.9% by mass or less, 6% by mass or less, and 20% by mass or less.

Further, other than the above-described Al and Si, it is preferable to have one member or two members or more of Mg, Ti and rare-earth elements included as the readily-oxidizing element in the zinc-plated layer. In this case, it is possible to make the oxidized film much firmer, and it becomes possible as well to suppress the volatilization of Zn more. Therefore, the before-quenching-treatment zinc-plated layer is such that it is possible to exemplify modes, which contain one member or two members or more of Mg, Ti, rare-earth elements (Ce, and the like), Fe, Ni and Co in an amount of 3.0% by weight or less, or 2.0% by mass or less.

When the aforementioned readily-oxidizing elements are less than 0.15% by mass, or in such a neutral atmosphere and a reducing atmosphere that the in-furnace atmosphere is less-than-0.1%-by-volume oxygen, no dense film of readily-oxidizing element can be formed sufficiently. In this case, the vaporizing-off of Zn is done, and accordingly the Zn amount for rustproofing is decreased. Moreover, when the heating temperature is much lower than the aforementioned temperature region, although it is advantageous for the volatilization prevention of Zn, the quenching for obtaining the high-strength formed body, the original object, cannot be done sufficiently. When the heating temperature is much higher than the aforementioned temperature region, even with the oxidized film which results from the readily-oxidizing elements, the vaporizing-off by means of the boiling of Zn cannot be suppressed.

In accordance with the present invention, it is possible to exemplify a mode in which heating upon quenching is carried out while growing the oxidized film. Further, in order to make the corrosion resistance equal to or more than that of the ordinary zinc-plated layer, the "Zn—Fe alloy layer in which Zn is a major component and which is formed of Fe: 30% by mass or less" should be made in an amount of 30 g/m$^2$ or more. In order to do so, as the alloying-retarding element, it is preferable to contain each of metals, which are formed of Al and Si which double as the readily-oxidizing element, independently or compositely in an amount of 0.15% by mass or more.

When the aforementioned elements are present in an amount of 0.15% by mass or more in the zinc-plated layer in the instance prior to the heating for quenching, even upon being heated to a high temperature of 800° C. or more, it is possible to control the diffusion of Zn into the base iron remarkably. As a result, even after the quenching treatment, it is possible to make the "Zn—Fe alloy layer in which Zn is a major component and which is formed of Fe: 30% by mass or less" in an amount of 30 g/m$^2$ or more. In this case, it can be set at 40 g/m$^2$ or more, 50 g/m$^2$ or more, 80 g/m$^2$ or more, 100 g/m$^2$ or more, 200 g/m$^2$ or more, 250 g/m$^2$ or more, and the like.

On the contrary, when the aforementioned elements are less than 0.15% by mass, the diffusion of Zn into the base iron of steel material is too fast; the "Zn—Fe alloy layer in which Zn is a major component and which is formed of Fe: 30% by mass or less" disappears virtually until the temperature of steel material reaches 800° C.; and accordingly the favorable corrosion resistance cannot be demonstrated. Note that the upper limit value of the concentration of alloying-retarding elements in the zinc-plated layer can be in such a range that does not change this Zn—Fe alloy layer, because they are added in order to obtain the "Zn—Fe alloy layer in which Zn is a major component and which is formed of Fe: 30% by mass or less"; taking the cost, too, into account, it is sufficient that, when the before-quenching zinc-plated layer is taken as 100% by mass, the alloying-retarding elements can be 20% by mass or less.

Regarding the holding time for holding it at the heating temperature, although it depends on the thickness (plate thickness) of steel material (steel plate) to be heated, the oxygen concentration, and the like, it can be such a temperature that a steel material as a whole reaches a temperature required for quenching. For example, it is possible to exemplify 1 second-50 minutes, and 10 seconds-20 minutes. In general, the thinner the thickness of steel material is the shorter the heating time is, and the thicker the thickness of steel material is the longer the heating time is. When the temperature-ascending time for ascending the temperature to a target temperature is appropriate, the holding time can be either 0 second or 0 minute.

Moreover, in the case where the heating time is prolonged by means of the thickness of steel material, a furnace length and a handling apparatus, it is preferable to increase the alloying-retarding-element amount per unit area in the plated layer (the concentration increment of these alloys in the plated layer or the increment of plated amount).

With regard to the heating method, it can be any one of internal heating, such as induction heating, external heating, such as infrared heating, gas heating and electric furnaces, and using these combinedly for shortening the heating-time. Note that, as for the plated amount of Zn, although it depends on aiming corrosion-resistance targets, it can be 40 g/m² or more; however, when taking the time for the handling of heating furnace and the temperature fluctuation into consideration, it can preferably be 60 g/m² or more; when taking the running of Zn, which results from the disposition of steel material within a furnace, into consideration, it can preferably be 300 g/m² or less. In particular, it can preferably be 180 g/m² or less so that the occurrence of running is hardly appreciated even when it is disposed perpendicularly.

The aforementioned zinc-plated layer, as it can be apparent from the aforementioned principle, can be those prepared by a molten zinc plating method in which a zinc-plated layer is adhered to it by immersing it into zinc in molten state. Although it is possible to employ alloyed molten zinc-plated materials, which have been alloyed in advance, they result in the superfluous disappearance of the alloying-retarding elements (Al, Si, and the like), and accordingly the effects tends to reduce. Moreover, although an electric zinc plating method, too, can be employed, it is costly because a pretreatment, and so forth, is needed for the addition of the alloying-retarding elements (Al, Si, and the like).

Next, although it is on the quenching, it can be done at a cooling rate which makes quenching possible; it can be any one of methods, such as water cooling the formed-body steel material, cooling by means of contact with die, and gas cooling. As for the cooling by means of contact with die, die quenching can be named. By means of quenching, quenched structures can be obtained.

Note that, although it is on the mode of the present method, it can be anyone of [1] a zinc-plated-system steel material is heated and then cooled after it is cold worked, [2] a steel material is heated and then cooled after it is cold worked and then subjected to zinc plating, [3] a zinc-plated-system steel material is worked and then cooled after it is heated like so-called hot pressing.

Although a configuration as the formed-body steel material is not limited in particular, it is possible to exemplify platelike shapes, and aggregated shapes. As for the platelike thickness, although it is not limited in particular, it is possible to exemplify 1 mm or less, 2 mm or less, 5 mm or less, and 10 mm or less; however, it is not limited to these. As for the carbon content of the formed-body steel material, it can be hardenable amounts; when taking the formed-body steel material as 100% by mass, 0.01-0.9% by mass, 0.1-0.7% by mass, and 0.1-0.4% by mass can be exemplified; however, it is not limited to these.

Next, it is on the components of the steel material, any one of ordinary hardenable steel materials is allowable. In general, although the following steel-material components can be exemplified, they are not limited to these. The steel-material components, as the composition of the steel material, contain C: 0.01-0.30%, Si: 0.005-1.0%, Mn: 0.01-3.0%, P: 0.005-0.10%, S: ≤0.02%, and N: 0.001-0.01%, by mass %. Note that, as the steel-material components, it is preferable to contain B: 2-100 ppm, Cr: 0.02-0.500%, Mo: 0.001-0.500%, and Ni: 0.001-1.000%; further, as the compositional elements of the steel material, it is preferable to contain one member or two members or more selected from the group of Nb: 0.005-0.100%, V: 0.005-0.100%, Ti: 0.005-0.100%, and Zr: 0.005-0.100%.

Next, the after-quenching formed-body steel material will be described. In accordance with the present invention, there should be the "Zn—Fe alloy layer in which Zn is a major component and which is formed of Fe: 30% by mass or less" in an amount of 30 g/m² or more in the surface of the after-quenching formed-body steel material. When being less than 30 g/m², no sufficient corrosion resistance can be obtained because the alloy layer, which is generated by means of heating upon quenching and in which Fe is a major component, generates Fe rust upon corrosion and expands volumetrically. Note that, with regard to the Zn—Fe layer, which is generated by means of heating and in which Fe is a major component, although no limitation is set up therefor especially, in the present invention, it often generates in amount of 5 g/m² or more in general. The after-quenching strength can be such that needed strength is available; although it depends on purposes, it can be 800 MPa or more.

Note that, after the quenching treatment, even when the superficial oxidized film is removed with an alkaline liquid or an acidic liquid for the purpose of the improvement of coating adhesiveness or chemical treatability, it falls within the scope of the present invention as far as it is possible to let the "Zn—Fe alloy layer in which Zn is a major component and which is formed of Fe: 30% by mass or less" exist. Moreover, even when having an element, such as Ni, Co, Mn, P and B, contained in the Zn—Fe alloy layer (alloy-plated layer) for the purpose of the further improvement of corrosion resistance or the improvement of chemical treatability, it falls within the scope of the present invention as far as Zn is the major component and it is formed of Fe: 30% by mass or less.

EXAMPLES

Examples of the present invention will be named along with comparative examples. As for the steel material (formed-body steel material), hot-rolled steel plates and cold-rolled steel plates, which were produced by ordinary production processes, were used. Table 1 specifies these steel components. And, zinc-plated layers were laminated onto the steel materials, thereby forming test pieces. Table 2 specifies the data on zinc-plated layers, and the data on the heating conditions of quenching treatments. Table 3 specifies the afterquenching-treatment data. Here, Table 2 specifies the steel species of test pieces, the plate thicknesses of test pieces, the plating conditions (plating methods, plated amounts, inner Zn amounts, the compositions of plated layers, the plating species of upper-layer plating, the plated amounts of upper-layer plating, and the heating conditions in quenching treatments (heating methods, heating temperatures, holding times, heating atmospheres, and oxygen concentrations)). Here, the "holding time" means the time for holding them at a heating temperature, a target temperature; and, when a test piece is quenched immediately after the temperature is increased to a heating temperature, the holding time becomes 0 minutes. The "air ratio=1" in the heating atmosphere means onefold of theoretical combustion amount. The "air ratio=1.1" means 1.1 times of theoretical combustion amount.

Table 3 specifies the cooling methods in quenching treatments, the data on "Fe<30% Zn—Fe alloy layer," the data on "30%<Fe Zn—Fe alloy layer," the Zn volatilization amounts, the corrosion resistance (swollen width), and the strength. Here, "Fe<30% Zn—Fe alloy layer," specified in Table 3, is equivalent to a "layer in which Zn is a major component and which is formed of Fe: 30% by mass or less (equivalent to later-described portion "A")." Moreover, "30%<Fe Zn—Fe alloy layer" is equivalent to a "layer in which Fe is a major component and is beyond Fe: 30% by mass (equivalent to later-described portion "B")."

Here, it is difficult to carry out the addition of readily-oxidizing element and alloying-retarding element to a plated layer by electroplating. Accordingly, a predetermined amount of readily-oxidizing element and alloying-retarding element was added to a molten Zn plating bath, and it was carried out by an ordinary molten Zn plating method. Note that, with regard to the steel species ("D" in Table 1), in which Si>0.2%, Mn>1.5% and B>15 ppm, since the plating wettability is insufficient, after forming an Fe plating in an amount of 5 g/m$^2$ as undercoated plating by electroplating, a molten Zn-plated layer was formed on the undercoated plating (Example No. 28 and Comparative Example No. 13).

With regard to the addition of Fe, Ni and Co to the Zn-plated layers, it was carried out in the following manner. That is, ready-made plating baths mentioned below were used; prior to quenching, upper-layer electroplating was performed onto the top of molten zinc plated layers. Thereafter, it was carried out by diffusing Fe, Ni and Co into zinc-plated layers by means of heating upon quenching (Example Nos. 23-26). As for the upper-layer electroplating, it was done as follows.

Electro-Fe-plating: Ferrous Sulfate Plating Bath
Electro-Ni-plating: Watt Bath
Electro-Co-plating: Cobalt Sulfate Plating Bath Note that, in accordance with the present example, the treatment for actively forming a barrier layer on a zinc-plated layer was not performed prior to the quenching treatment.

With regard to the quenching treatment, based on the heating conditions specified in Table 2, the steel plates were heated up to heating temperatures within an electric furnace, or a high-frequency induction heating furnace, or gas furnace, or an infrared heating furnace, in an air atmosphere, or in predetermined-air-ratio atmospheres. Thereafter, the steel plates were taken out of the furnaces; and then, based on the cooling methods specified in Table 3, the steel plates were quenched by means of water cooling, or die cooling, or gas cooling, thereby carrying out quenching.

In accordance with the present examples, with regard to the "Fe<30% Zn—Fe alloy layer," it was analyzed as follows. That is, the test pieces having zinc-plated layers were placed in a 150-g/liter ammonium chloride (NH$_4$Cl) aqueous solution while using a saturated calomel electrode as a reference electrode; and then the plated layers (layer "G": the portion "A" of the drawings in examples and comparative examples) were come off down to the layer "G," at which the potential changed greatly to a potential of −800 mV (vs. SCE), by electrolysis by means of constant-current electrolysis with 4 mA/cm$^2$ at room temperature. Here, "−800 mV (vs. SCE)" means a negative-side potential, a potential which was lower than the potential of saturated calomel electrode by 800 mV. This electrolyte includes components resulting from the dissolved portion "A." The electrolytes, into which the portion "A" thus dissolved, were analyzed by means of an ICP (Inductively Coupled Plasma) analyzing apparatus. By means of this, with regard to the "layers in which Zn is to a major component and which are formed of Fe: 30% by mass or less," the Fe amounts, the Zn amounts, and the compositional ratios were found; and then the alloy-layer amounts (g/m$^2$), the inner Zn amounts (g/m$^2$), and the Fe % s were found, as the plated amounts, which exhibited rust-preventive effect. They were specified in Table 3.

Moreover, with regard to the measurement of "30%<Fe Zn—Fe alloy layer," it was electrolyzed down to the aforementioned layer "G" to come off the portion "A" of zinc-plated layer; and thereafter the electrolyte was replaced with a new solution; and it was electrolyzed up to the potential of iron (about −560 mV (vs. SCE)) (equivalent to the portion "C" of the drawings in examples and comparative examples) continuously. This electrolyte includes components resulting from the dissolved portion "B." And, the electrolytes were analyzed by means of an ICP analyzing apparatus similarly; the Fe amounts, the Zn amounts, and the compositional ratios were found; and then the alloy-layer amounts (g/m$^2$), the inner Zn amounts (g/m$^2$), and the Fe % s were found. They were specified in Table 3. Here, in Table 3, the "alloy-layer amount g/m$^2$," which is set forth in the columns of "Fe<30% Zn—Fe alloy layer" and "30%<Fe Zn—Fe alloy layer," means the total amounts of alloying elements, such as Zn, Fe, Al and Si, which were contained in Zn—Fe alloys. Moreover, in Table 3, the "Zn volatilization amount" was such that the differences between the before-heat-treatment Zn amounts and the after-heat-treatment Zn amounts were measured by means of ICP.

In Table 3, in accordance with Example Nos. 1-28, the "layer in which Zn is a major component and which is formed of Fe: 30% by mass or less (equivalent to the portion "A")" was made in an amount of 30 g/m$^2$ or more after quenching treatment. In this layer, the inner Zn amount was made in an amount of 14 g/m$^2$ or more. The "inner Zn amount" means a Zn amount in the "layer in which Zn is a major component and which is formed of Fe: 30% by mass or less (equivalent to the portion "A")."

With regard to the strength, in order to make the after-production strength evaluation tougher, test pieces (JIS #5 tensile test piece) were cooled by means of gas jet; and thereafter they were evaluated by stretching them in the "L"-direction. The evaluation results are specified in Table 3. Those, which surpassed 800 MPa, were evaluated being satisfactory. In accordance with Example Nos. 1-28, they surpassed 800 MPa.

With regard to the corrosion resistance, the test pieces were evaluated in the following manner: degreasing was carried out, and a chemical treatment was carried out onto an after-production surface with "Palbond LA35 (produced by NIHON PARKERIZING Corp.)" as prescribed by the maker; further cationic electrodeposition coating ("Powernics 110": produced by NIPPON PAINT Corp.) was performed in a thickness of 15 μm; and then, after subjecting it to cross cutting, the paint-film swollen width (one-sided) from the cross-cut portion was measured under the corrosion testing conditions (SAE-J2334, a standard of the society of American Automobile Industry) after performing the test 300 cycles. The measurement results are specified in Table 3.

Figure 1:
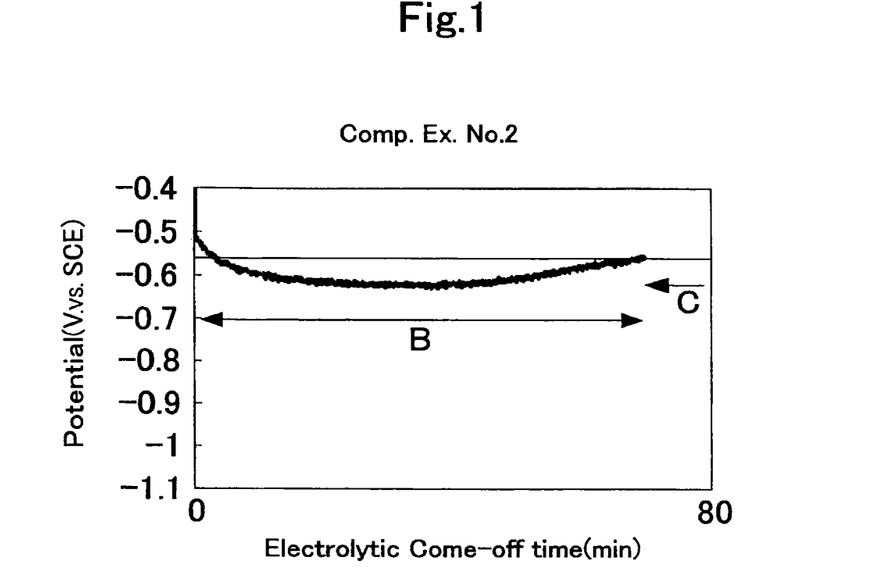
FIG. 1 is an explanatory diagram for illustrating an electrolytic come-off curve in Comparative Example No. 2.
Figure 2:
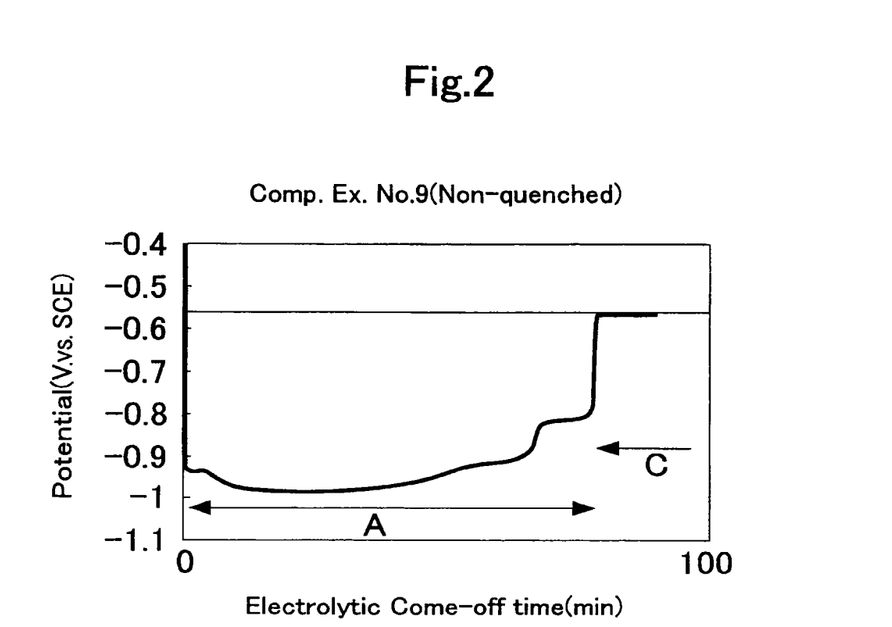
FIG. 2 is an explanatory diagram for illustrating an electrolytic come-off curve in Comparative Example No. 9.
Figure 3:
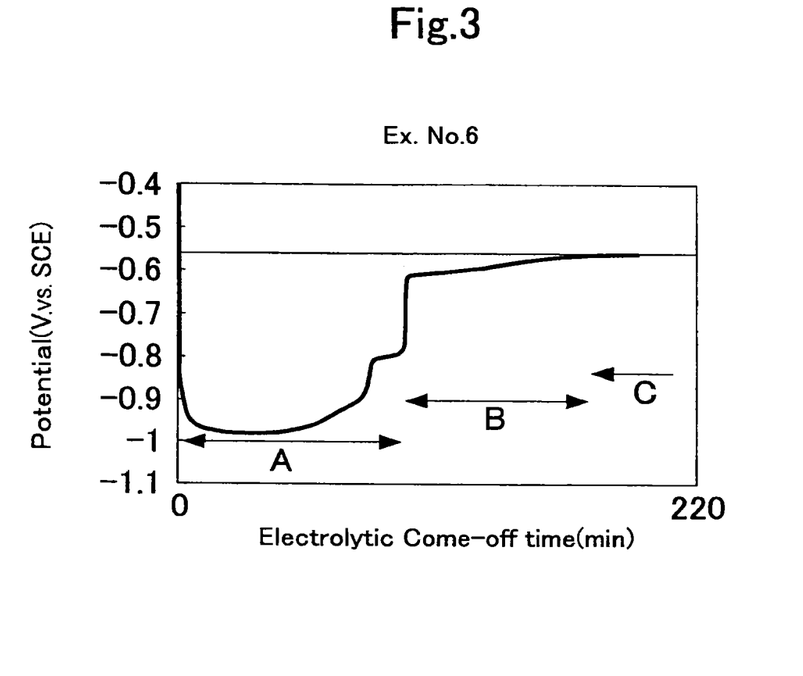
FIG. 3 is an explanatory diagram for illustrating an electrolytic come-off curve in Example No. 6.
Figure 4:
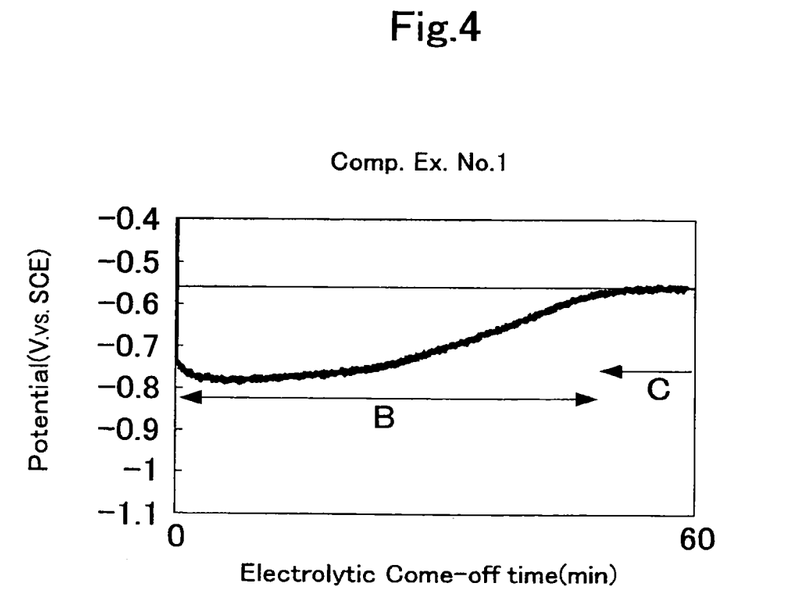
FIG. 4 is an explanatory diagram for illustrating an electrolytic come-off curve in Comparative Example No. 1.
Figure 5:
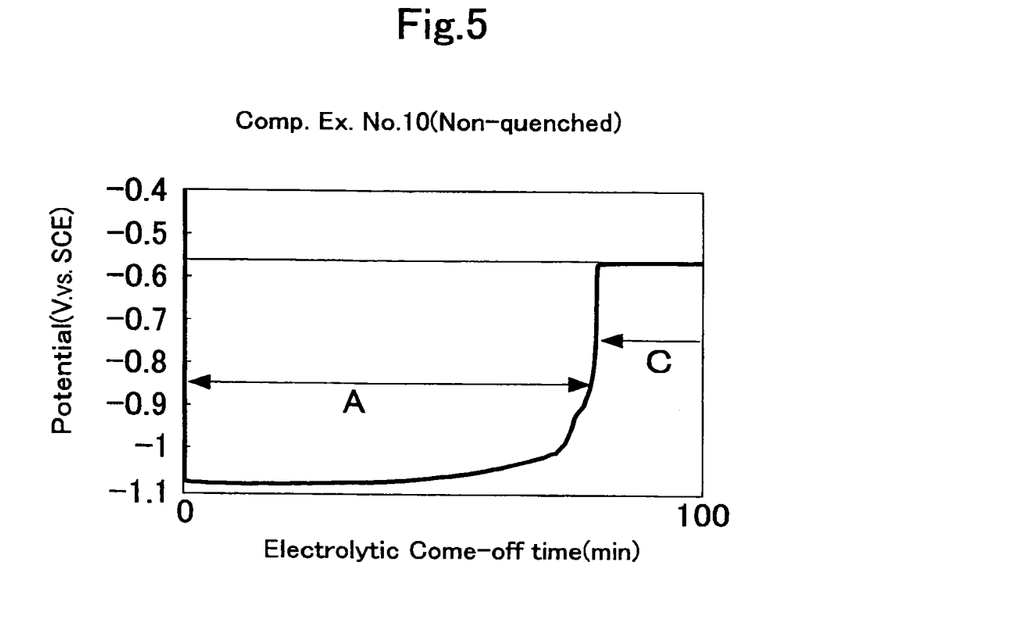
FIG. 5 is an explanatory diagram for illustrating an electrolytic come-off curve in Comparative Example No. 10.
Figure 6:
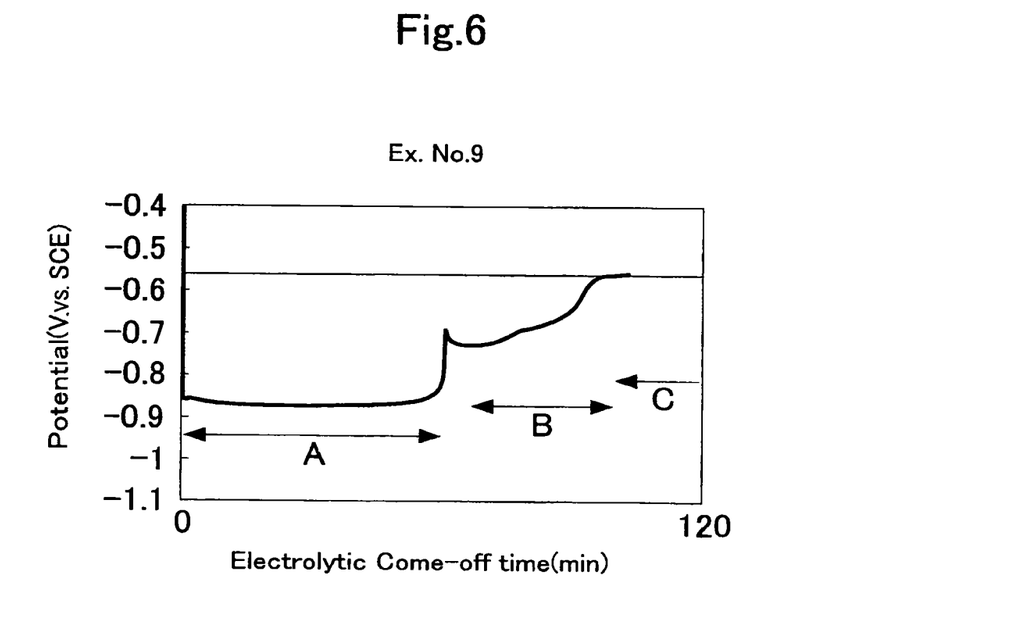
FIG. 6 is an explanatory diagram for illustrating an electrolytic come-off curve in Example No. 9.
Figure 7:
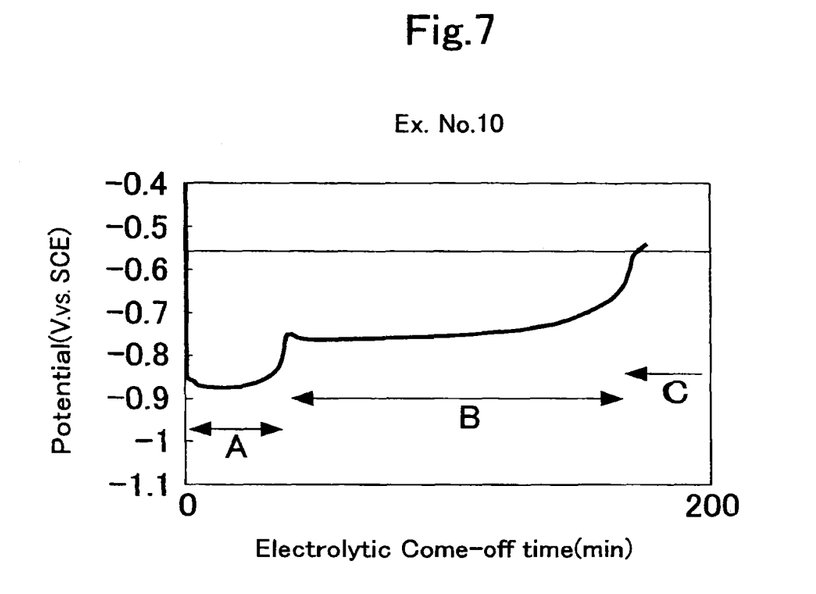
FIG. 7 is an explanatory diagram for illustrating an electrolytic come-off curve in Example No. 10.
Figure 8:
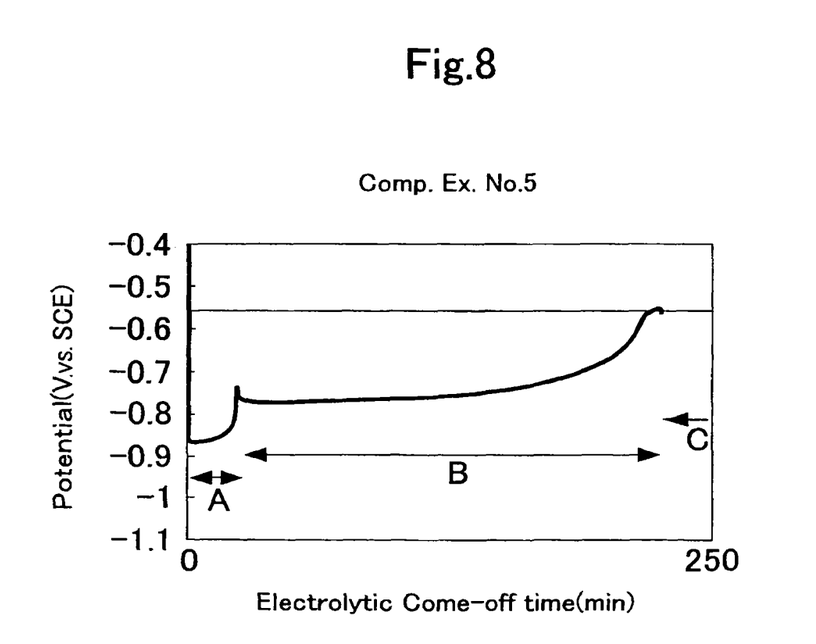
FIG. 8 is an explanatory diagram for illustrating an electrolytic come-off curve in Comparative Example No. 5.

In order to make the present invention more definite, the examples and comparatives will be explained while illustrating the electrolytic come-off curves, which were shown at the time of having the plated layers come off electrolytically, in FIG. 1-FIG. 8. The electrolytic come-off curves specify from the beginning of electrolysis to base iron. FIG. 1 illustrates Comparative Example No. 2. FIG. 2 illustrates Comparative Example No. 9. FIG. 3 illustrates Example No. 6. FIG. 4 illustrates Comparative Example No. 1. FIG. 5 illustrates Comparative Example No. 10. FIG. 6 illustrates Example No. 9. FIG. 7. illustrates Example No. 10. FIG. 8 illustrates Comparative Example No. 5.

Comparative Example No. 9 illustrated in FIG. 2 is an ordinary alloyed steel plate, which was made by molten zinc-plating but which was not quenched. In FIG. 2, the portion "A" is a region which exhibits a potential of about −800 mV (vs. SCE) or less, and designates a layer which is formed of Fe: 30% by mass or less. As can be understood from FIG. 2 and Table 2, in Comparative Example No. 9, the plated layer is formed of the "Zn—Fe layer which is formed of Fe: 30% by mass or less" which exhibits a potential of about −800 mV (vs. SCE) or less, namely, the portion "A" alone. In Comparative Example No. 9, since no heating upon quenching is carried out, the later-described portion "B" is not generated. And, after the layer of portion "A" has dissolved, the portion "C," iron (the test piece's iron substrate), which exhibits a potential of about −560 mV, is exposed.

Comparative Example No. 10 illustrated in FIG. 5 is an ordinary alloyed steel plate, which was made by molten zinc-plating but which was not quenched. As can be understood from FIG. 5 and Table 2, Comparative Example No. 10 has the portion "A" and portion "C" similarly to Comparative Example No. 9. Since no heating upon quenching is carried out, the later-described portion "B" is not generated. As described above, the portion "A" is a region which exhibits a potential of about −800 mV (vs. SCE) or less, and is a Zn—Fe layer which includes Fe: 30% by mass or less. Therefore, the portion "A" is equivalent to a layer in which Fe is less but Zn is more and whose corrosion resistance is satisfactory. The portion "C" is equivalent to the iron substrate, which constitutes the test piece (formed-body steel material). Note that, although it is natural, both of them (Comparative Example Nos. 9 and 10) do not become high strength at all as specified in Table 3 because they are not strengthened by quenching.

Here, FIG. 3 illustrates the electrolytic come-off curve of Example No. 6. FIG. 6 illustrates the electrolytic come-off curve of Example No. 9. FIG. 7 illustrates the electrolytic come-off curve of Example No. 10. FIG. 8 illustrates the electrolytic come-off curve of Comparative Example No. 5. In accordance with Example No. 6, Example No. 9, Example No. 10 and Comparative Example No. 5, the portion "B" exists in addition to the portion "A" and portion "C," as illustrated in FIG. 3, FIG. 6, FIG. 7 and FIG. 8. Here, the portion "B" exhibits intermediate potentials from the region of the potential of about −560 mV (vs. SCE) down to the region of the potential of about −800 mV (vs. SCE). This portion "B" is a layer, which is generated within the zinc-plated layer by means of the heating upon quenching, and is a "Zn—Fe alloy layer in which Zn is less and Fe is a major component (in excess of 30%-by-mass Fe)." The present invention is such that it is the chief aim to make the portion "A" whose corrosion resistance is good, not the portion "B" whose corrosion resistance is not sufficient, in an amount of 30 g/cm$^2$ or more.

In Example No. 6 illustrated in FIG. 3, Example No. 9 illustrated in FIG. 6, Example No. 10 illustrated in FIG. 7, and Comparative Example No. 5 illustrated in FIG. 8, the zinc-plated steel plates, which contained the alloying-retarding elements and readily-oxidizing elements in an amount of 0.16% by mass, were heated to 850° C. in a 0.10%-by-volume oxygen atmosphere; and were thereafter quenched while changing the holding time only. In Comparative Example No. 5, despite the fact that the thickness of the steel plate is 1.6 mm, since the holding time is as long as 15 minutes relatively, the "Zn—Fe layer which is formed of Fe: 30% by mass or less" is 18 g/m$^2$, and is less than 30 m$^2$/g. From the comparison between Example Nos. 9 and 10 and Comparative Example No. 5, it is appreciated that, as the heating time becomes longer, the portion "A" decreases but the portion "B" increases.

As can be understood from Table 2 and Table 3, Comparative Example No. 1 is such that an ordinary electrogalvanized steel plate was quenched by heating. In Comparative Example No. 1, since no alloying-retarding elements and readily-oxidizing elements (Al, Si) exist so that, although the heating conditions are lax, no portion "A" exists but it becomes the portion "B" alone, the corrosion resistance is not demonstrated, and the volatilization of zinc is great as well.

As can be understood from Table 2 and Table 3, Comparative Example No. 2 is such that an alloyed molten zinc-plated steel plate was quenched by heating. In Comparative Example No. 2, since the alloying-retarding elements and readily-oxidizing elements are less (Al: 0.10% by mass) and the alloying treatment is carried out in advance, no portion "A" exists but the growth of the portion "B" is remarkable; and the corrosion resistance is demonstrated much worse than that of Comparative Example No. 1, and the volatilization of zinc is great as well.

As specified in Table 3, in Example Nos. 1-28 according to the present invention, the "layer in which Zn is a major component and which is formed of Fe: 30% by mass or less (Fe: 9-23% by mass)" (equivalent to the portion "A") is made in an amount of 30 g/m$^2$ or more (31-223 g/m$^2$). In such Example Nos. 1-28, the swollen width was small, and accordingly the corrosion resistance was satisfactory. Incidentally, Example No. 5 exhibits Fe: 9% by mass, and Example No. 9 exhibits Fe: 23% by mass. Example No. 5 exhibits 223 g/m$^2$, and Example No. 10 exhibits 31 g/m$^2$.

Moreover, an alloy layer (equivalent to the portion "B"), which is generated by means of heating in quenching and in which Fe is a major component, is formed in an amount of 5 g/m$^2$ or more (5-155 g/m$^2$). As above, in order to demonstrate the after-quenching corrosion resistance in zinc-system-plated steel materials, the present invention has been completed by leaving the portion "A," which has the anticorrosion effect, in a predetermined amount or more, by means of the suppression and control of the generation of portion "B," which results from heating in quenching, and the suppression of the volatilization of zinc.

TABLE 1

| Steel Species No. | C | Si | Mn | P | S | Al | Ti | Cr | Ni | Nb | Mo | V | Zr | B | N |
|---|---|---|---|---|---|---|---|---|---|---|---|---|---|---|---|
| "A" | 0.21 | 0.15 | 1.30 | 0.02 | 0.01 | 0.05 | 0.03 | 0.3 | 0.02 | 0.05 | 0.1 | 0.05 | 0.01 | 20 ppm | 30 ppm |
| "B" | 0.18 | 0.15 | 0.70 | 0.01 | 0.01 | 0.08 | 0.02 | 0.2 | 0.8 | 0.07 | 0.4 | 0.01 | 0.02 | 10 ppm | 40 ppm |
| "C" | 0.11 | 0.20 | 1.10 | 0.01 | 0.01 | 0.07 | 0.01 | 0.2 | 0 | 0.02 | 0.3 | 0.01 | 0.02 | 10 ppm | 30 ppm |
| "D" | 0.30 | 0.25 | 1.60 | 0.02 | 0.01 | 0.05 | 0.03 | 0.3 | 0.02 | 0.05 | 0.1 | 0.05 | 0.01 | 20 ppm | 30 ppm |

Except B and N, % by mass

TABLE 2

| No. | | Steel Species | Plate Thickness mm | Before Heating | | | | | | | | | | | | Upper-layer Plating | | | Heating Condition | | | |
|---|---|---|---|---|---|---|---|---|---|---|---|---|---|---|---|---|---|---|---|---|---|---|
| | | | | Plating Method | Plated Amount g/m² | Inner Zn Amount g/m² | Fe % | Composition (%) | | | | | | | Plated Species | Plated Amount g/m² | Heating Method | Heating Temp. °C | Holding Time min. | Heating Atmosphere | Oxygen Concentration |
| | | | | | | | | Al | Si | Mg | Ti | Ce | | | | | | | | | |
| Comp. Ex. | 1 | "A" | 1.6 | Electro Galvanizing | 60 | 60 | <1% | 0.00 | | | | | | | | | Electric Furnace | 820 | 0 | Air (oxygen: 20%) | 20% |
| Comp. Ex. | 2 | "A" | 1.6 | Alloyed Molten Zinc | 62 | 56 | 9 | 0.10 | | | | | | | | | Electric Furnace | 820 | 0 | Air (oxygen: 20%) | 20% |
| Comp. Ex. | 3 | "B" | 1.0 | Molten Zinc | 31 | 31 | <1% | 0.20 | | | | | | | | | Electric Furnace | 820 | 0 | Air (oxygen: 20%) | 20% |
| Ex. | 1 | "B" | 1.0 | Molten Zinc | 42 | 42 | <1% | 0.20 | | | | | | | | | Electric Furnace | 820 | 0 | Air (oxygen: 20%) | 20% |
| Ex. | 2 | "A" | 1.6 | Molten Zinc | 59 | 59 | <1% | 0.20 | | | | | | | | | Electric Furnace | 900 | 0 | Air (oxygen: 20%) | 20% |
| Ex. | 3 | "B" | 1.8 | Molten Zinc | 88 | 88 | <1% | 0.20 | | | | | | | | | Electric Furnace | 900 | 0 | Air (oxygen: 20%) | 20% |
| Ex. | 4 | "C" | 2.3 | Molten Zinc | 122 | 122 | <1% | 0.20 | | | | | | | | | Electric Furnace | 900 | 0 | Air (oxygen: 20%) | 20% |
| Ex. | 5 | "C" | 3.2 | Molten Zinc | 265 | 264 | <1% | 0.20 | | | | | | | | | Electric Furnace | 900 | 0 | Air (oxygen: 20%) | 20% |
| Comp. Ex. | 4 | "A" | 1.6 | Molten Zinc | 92 | 92 | <1% | 0.16 | | | | | | | | | Gas Furnace | 700 | 5 | Air Ratio = 1 | 0.10% |
| Ex. | 6 | "A" | 1.6 | Molten Zinc | 92 | 92 | <1% | 0.16 | | | | | | | | | Gas Furnace | 850 | 0 | Air Ratio = 1 | 0.10% |
| Ex. | 7 | "A" | 1.6 | Molten Zinc | 92 | 92 | <1% | 0.16 | | | | | | | | | Gas Furnace | 850 | 1 | Air Ratio = 1 | 0.10% |
| Ex. | 8 | "A" | 1.6 | Molten Zinc | 92 | 92 | <1% | 0.16 | | | | | | | | | Gas Furnace | 850 | 3 | Air Ratio = 1 | 0.10% |
| Ex. | 9 | "A" | 1.6 | Molten Zinc | 92 | 92 | <1% | 0.16 | | | | | | | | | Gas Furnace | 850 | 5 | Air Ratio = 1 | 0.10% |
| Ex. | 10 | "A" | 1.6 | Molten Zinc | 92 | 92 | <1% | 0.16 | | | | | | | | | Gas Furnace | 850 | 10 | Air Ratio = 1 | 0.10% |
| Comp. Ex. | 5 | "A" | 1.6 | Molten Zinc | 92 | 92 | <1% | 0.16 | | | | | | | | | Gas Furnace | 850 | 15 | Air Ratio = 1 | 0.10% |
| Ex. | 11 | "A" | 1.6 | Molten Zinc | 92 | 92 | <1% | 0.16 | | | | | | | | | Gas Furnace | 950 | 1 | Air Ratio = 1 | 0.10% |
| Comp. Ex. | 6 | "A" | 1.6 | Molten Zinc | 92 | 92 | <1% | 0.16 | | | | | | | | | Gas Furnace | 1050 | 1 | Air Ratio = 1 | 0.10% |

TABLE 2-continued

| | | | Before Heating | | | | | | | | | | | Upper-layer Plating | | Heating Condition | | | |
|---|---|---|---|---|---|---|---|---|---|---|---|---|---|---|---|---|---|---|---|
| | | Plate Thickness | Plating Method | Plated Amount | Inner Zn Amount | Composition (%) | | | | | | | | Plated Species | Plated Amount | Heating Method | Heating Temp. | Holding Time | Heating Atmosphere | Oxygen Concentration |
| No. | Steel Species | mm | | g/m² | g/m² | Fe % | Al | Si | Mg | Ti | Ce | | | | g/m² | | °C. | min. | | |
| Ex. 12 | "A" | 1.6 | Molten Zinc | 92 | 92 | <1% | 0.16 | | | | | | | | | Gas Furnace | 950 | 1 | Air Ratio = 1.1 | 1% |
| Comp. Ex. 7 | "A" | 1.6 | Molten Zinc | 92 | 92 | <1% | 0.16 | | | | | | | | | Gas Furnace | 950 | 1 | Air Ratio = 0.9 | 0.1 ppm |
| Ex. 13 | "C" | 1.2 | Molten Zinc | 61 | 60 | <1% | 1.00 | | | | | | | | | Gas Furnace | 950 | 1 | Air Ratio = 1.1 | 1% |
| Ex. 14 | "C" | 1.2 | Molten Zinc | 61 | 58 | <1% | 5.00 | | | | | | | | | Gas Furnace | 950 | 1 | Air Ratio = 1.1 | 1% |
| Ex. 15 | "C" | 1.2 | Molten Zinc | 61 | 54 | <1% | 11.00 | | | | | | | | | Gas Furnace | 950 | 1 | Air Ratio = 1.1 | 1% |
| Ex. 16 | "C" | 1.2 | Molten Zinc | 61 | 49 | <1% | 20.00 | | | | | | | | | Gas Furnace | 950 | 1 | Air Ratio = 1.1 | 1% |
| Ex. 17 | "C" | 1.2 | Molten Zinc | 90 | 90 | <1% | 0.00 | 0.3 | | | | | | | | Induction Heating | 900 | 3 | Air (oxygen: 20%) | 20% |
| Ex. 18 | "C" | 1.2 | Molten Zinc | 90 | 91 | <1% | 0.10 | 0.2 | | | | | | | | Induction Heating | 900 | 3 | Air (oxygen: 20%) | 20% |
| Ex. 19 | "C" | 1.2 | Molten Zinc | 90 | 89 | <1% | 0.20 | 0.1 | | | | | | | | Induction Heating | 900 | 3 | Air oxygen: 20% | 20% |
| Ex. 20 | "C" | 1.2 | Molten Zinc | 90 | 92 | <1% | 0.00 | | 0.2 | | | | | | | Induction Heating | 900 | 3 | Air (oxygen: 20%) | 20% |
| Ex. 21 | "C" | 1.2 | Molten Zinc | 90 | 88 | <1% | 0.20 | | 0.3 | | | | | | | Induction Heating | 900 | 3 | Air (oxygen: 20%) | 20% |
| Ex. 22 | "C" | 1.2 | Molten Zinc | 90 | 88 | <1% | 0.20 | | | 0.1 | 0.1 | | | | | Induction Heating | 900 | 3 | Air (oxygen: 20%) | 20% |
| Ex. 23 | "C" | 1.2 | Molten Zinc | 90 | 86 | <1% | 0.20 | | | | 0.1 | Ni | 5 | | | Induction Heating | 900 | 3 | Air (oxygen: 20%) | 20% |
| Ex. 24 | "C" | 1.2 | Molten Zinc | 90 | 92 | <1% | 0.16 | | | | | Ni | 2 | | | Induction Heating | 900 | 3 | Air (oxygen: 20%) | 20% |
| Ex. 25 | "C" | 1.2 | Molten Zinc | 90 | 91 | <1% | 0.16 | | | | | Co | 5 | | | Induction Heating | 900 | 3 | Air (oxygen: 20%) | 20% |
| Ex. 26 | "C" | 1.2 | Molten Zinc | 90 | 93 | <1% | 0.16 | | | | | Fe | 3 | | | Induction Heating | 900 | 3 | Air (oxygen: 20%) | 20% |
| Ex. 27 | "C" | 1.8 | Molten Zinc | 125 | 125 | <1% | 0.22 | | | | | | | | | Infrared Heating | 800 | 0 | Air (oxygen: 20%) | 20% |

TABLE 2-continued

| | | Plate Thickness | | Before Heating | | Inner | | Composition (%) | | | | | | | Upper-layer Plating | | Heating | Heating Condition | | |
|---|---|---|---|---|---|---|---|---|---|---|---|---|---|---|---|---|---|---|---|---|
| No. | Steel Species | | mm | Plating Method | Plated Amount g/m² | Zn Amount g/m² | Fe % | Al | Si | Mg | Ti | Ce | Plated Species | Plated Amount g/m² | Heating Method | Heating Temp. °C. | Holding Time min. | Heating Atmosphere | Oxygen Concentration |
| Ex. 28 | "D" | | 0.8 | Molten Zinc | 118 | 118 | <1% | 0.21 | | | | | | | | Infrared Heating | 900 | 2 | Air (oxygen: 20%) | 20% |
| Comp. Ex. 8 | "A" | | 1.6 | Electro Galvanizing | 60 | 60 | <1% | 0.00 | | | | | | | | None | | | | |
| Comp. Ex. 9 | "A" | | 1.6 | Alloyed Molten Zinc | 62 | 56 | 9 | 0.10 | | | | | | | | None | | | | |
| Comp. Ex. 10 | "A" | | 1.6 | Molten Zinc | 59 | 59 | <1% | 0.20 | | | | | | | | None | | | | |
| Comp. Ex. 11 | "B" | | 1.8 | Molten Zinc | 88 | 88 | <1% | 0.20 | | | | | | | | None | | | | |
| Comp. Ex. 12 | "C" | | 2.3 | Molten Zinc | 122 | 122 | <1% | 0.20 | | | | | | | | None | | | | |
| Comp. Ex. 13 | "D" | | 0.8 | Molten Zinc | 122 | 122 | <1% | 0.21 | | | | | | | | None | | | | |

TABLE 3

| | | Cooling Method | Fe < 30% Zn—Fe Alloy Layer | | | 30% < Fe Zn—Fe Alloy Layer | | | Zn Volatilization Amount g/m² | Corrosion Resistance Swollen Width mm | Strength MPa |
|---|---|---|---|---|---|---|---|---|---|---|---|
| | | | Alloy Layer Amount g/m² | Inner (Zn Amount) g/m² | Fe % | Alloy Layer Amount g/m² | Inner (Zn Amount) g/m² | Fe % | | | |
| Comp. Ex. | 1 | Water Cooling | 0 | | | 104 | 47 | 55 | 13 | 30 | 1543 |
| Comp. Ex. | 2 | Water Cooling | 0 | | | 115 | 34 | 70 | 22 | 45 | 1555 |
| Comp. Ex. | 3 | Water Cooling | 21 | 16 | 22 | 27 | 15 | 46 | 0 | 12 | 1330 |
| Ex. | 1 | Water Cooling | 32 | 26 | 19 | 31 | 16 | 48 | 0 | 3 | 1328 |
| Ex. | 2 | Gas Cooling | 50 | 42 | 16 | 34 | 17 | 51 | 0 | 2 | 1515 |
| Ex. | 3 | Gas Cooling | 79 | 69 | 13 | 41 | 19 | 53 | 0 | 2 | 1288 |
| Ex. | 4 | Gas Cooling | 102 | 92 | 10 | 67 | 30 | 55 | 0 | 1 | 1026 |
| Ex. | 5 | Gas Cooling | 223 | 203 | 9 | 147 | 62 | 58 | 0 | 1 | 1033 |
| Comp. Ex. | 4 | Die Cooling | 68 | 61 | 11 | 61 | 31 | 49 | 0 | 1 | 630 |
| Ex. | 6 | Die Cooling | 85 | 74 | 13 | 36 | 18 | 50 | 0 | 1 | 1515 |
| Ex. | 7 | Die Cooling | 74 | 63 | 15 | 60 | 29 | 52 | 0 | 1 | 1520 |
| Ex. | 8 | Die Cooling | 59 | 48 | 18 | 91 | 43 | 52 | 0 | 2 | 1533 |
| Ex. | 9 | Die Cooling | 48 | 37 | 22 | 116 | 54 | 53 | 0 | 2 | 1540 |
| Ex. | 10 | Die Cooling | 31 | 24 | 23 | 155 | 68 | 56 | 0 | 3 | 1535 |
| Comp. Ex. | 5 | Die Cooling | 18 | 14 | 23 | 177 | 78 | 56 | 0 | 15 | 1538 |
| Ex. | 11 | Die Cooling | 73 | 62 | 15 | 63 | 30 | 53 | 0 | 1 | 1536 |
| Comp. Ex. | 6 | Die Cooling | 5 | 4 | 21 | 95 | 40 | 58 | 48 | 23 | 1541 |
| Ex. | 12 | Die Cooling | 75 | 64 | 15 | 57 | 28 | 51 | 0 | 1 | 1533 |
| Comp. Ex. | 7 | Die Cooling | 22 | 18 | 20 | 65 | 31 | 52 | 43 | 13 | 1532 |
| Ex. | 13 | Die Cooling | 51 | 43 | 15 | 39 | 17 | 56 | 0 | 2 | 1049 |
| Ex. | 14 | Die Cooling | 53 | 45 | 15 | 29 | 13 | 56 | 0 | 2 | 1052 |
| Ex. | 15 | Die Cooling | 55 | 46 | 16 | 18 | 8 | 55 | 0 | 2 | 1045 |
| Ex. | 16 | Die Cooling | 55 | 47 | 15 | 5 | 2 | 56 | 0 | 2 | 1043 |
| Ex. | 17 | Water Cooling | 62 | 53 | 15 | 74 | 37 | 50 | 0 | 1 | 1081 |
| Ex. | 18 | Water Cooling | 65 | 56 | 14 | 69 | 35 | 49 | 0 | 1 | 1077 |
| Ex. | 19 | Water Cooling | 64 | 54 | 16 | 72 | 35 | 51 | 0 | 1 | 1075 |
| Ex. | 20 | Water Cooling | 59 | 50 | 15 | 85 | 42 | 51 | 0 | 1 | 1082 |
| Ex. | 21 | Water Cooling | 60 | 52 | 13 | 75 | 36 | 52 | 0 | 1 | 1088 |
| Ex. | 22 | Water Cooling | 59 | 51 | 14 | 75 | 37 | 50 | 0 | 1 | 1079 |
| Ex. | 23 | Die Cooling | 53 | 42 | 21 | 96 | 44 | 54 | 0 | 2 | 1051 |
| Ex. | 24 | Die Cooling | 55 | 45 | 19 | 105 | 47 | 55 | 0 | 2 | 1047 |
| Ex. | 25 | Die Cooling | 53 | 42 | 20 | 108 | 49 | 55 | 0 | 2 | 1047 |
| Ex. | 26 | Die Cooling | 54 | 44 | 19 | 107 | 49 | 54 | 0 | 2 | 1055 |
| Ex. | 27 | Gas Cooling | 110 | 96 | 13 | 61 | 29 | 52 | 0 | 1 | 813 |
| Ex. | 28 | Water Cooling | 103 | 84 | 18 | 78 | 34 | 57 | 0 | 1 | 1980 |
| Comp. Ex. | 8 | | 60 | 60 | 0 | 0 | | | — | 2 | 613 |

TABLE 3-continued

|  |  |  | Fe < 30% Zn—Fe Alloy Layer | | | 30% < Fe Zn—Fe Alloy Layer | | | Corrosion | | |
|---|---|---|---|---|---|---|---|---|---|---|---|
|  |  | Cooling Method | Alloy Layer Amount g/m² | Inner (Zn Amount) g/m² | Fe % | Alloy Layer Amount g/m² | Inner (Zn Amount) g/m² | Fe % | Zn Volatilization Amount g/m² | Resistance Swollen Width mm | Strength MPa |
| Comp. Ex. | 9 |  | 62 | 56 | 9 | 0 |  |  | — | 1 | 615 |
| Comp. Ex. | 10 |  | 59 | 59 | 0 | 0 |  |  | — | 1 | 613 |
| Comp. Ex. | 11 |  | 88 | 88 | 0 | 0 |  |  | — | 1 | 488 |
| Comp. Ex. | 12 |  | 122 | 122 | 0 | 0 |  |  | — | 1 | 451 |
| Comp. Ex. | 13 |  | 122 | 122 | 0 | 0 |  |  | — | 1 | 615 |

Note that, before the quenching treatment, it is possible as well to think of a measure of forming a barrier layer, which comprises an oxidized film, on the zinc-plated layer of a steel material; in this case, however, when heating the steel material to a quenching temperature, or when heating it to the quenching temperature and holding it thereat, there is a fear that cracks might generate considerably in the zinc-plated layer because of the thermal expansion difference between the barrier layer, which has been formed originally on the steel material, and the zinc-plated layer. In this case, due to the cracks, the fear that the volatilization amount of zinc increases is highly likely; and, after the quenching treatment, it is not necessarily sufficient in order to obtain the plated layer whose corrosion resistance is good. In this a case, it is believed that the proportion of portion "A" is not so much as that of the present invention; and that the proportion of portion "B" becomes greater compared with that of the present invention.

It is possible to grasp the following technical ideas as well from the aforementioned descriptions.

A high-strength quenched formed body, which is good in corrosion resistance, being characterized in that: it comprises an after-quenching formed-body steel material; and a zinc-plated layer, which is disposed on the surface of said formed-body steel material, and which is subjected to a quenching treatment along with said formed-body steel material; said zinc-plated layer comprises a layer in which Zn is a major component, and which is formed of Fe: 30% by mass or less; and said layer, in which Zn is a major component and which is formed of Fe: 30% by mass or less, is made in an amount of 30 g/m² or more.

A process for producing a high-strength quenched formed body, process in which the following are performed sequentially: a step of preparing a formed-body steel material, on which a zinc-plated layer is coated, zinc-plated layer which contains each of Al and Si, which have alloying-retarding function and readily-oxidizing function, independently or compositely in an amount of 0.15% by more; and a step of quenching said formed-body steel material after heating it to a quenching temperature region in an oxidizing atmosphere of oxygen: 0.1% by volume or more, thereby producing a high-strength quenched formed body, which comprises said formed-body steel material after the quenching; and a layer being disposed on the surface of said formed-body steel material, the layer being subjected to a quenching treatment along with said formed-body steel material, the layer being made from Zn as a major component, and the layer being formed of Fe: 30% by mass or less; and said layer in which Zn is a major component and which is formed of Fe: 30% by mass or less is made in an amount of 30 g/m² or more. As for the quenching temperature region, 800-950° C. can be named.

The present invention is not limited to the examples, which are described above and are illustrated in the drawings, alone, but can be performed while modifying them suitably within ranges not-departing from the spirit or scope thereof.

INDUSTRIAL APPLICABILITY

The present invention can be utilized for high-strength quenched formed bodies and production processes for the same.

The invention claimed is:

1. A high-strength quenched formed body, being good in corrosion resistance, and the high-strength quenched formed body comprising:
 a formed-body steel material subjected to a quenching treatment; and a surface layer disposed on the surface of said formed-body steel material;
 wherein the surface layer has been subjected to the quenching treatment along with the formed-body steel material;
 the surface layer, before the quenching treatment, includes Fe: 1% by mass or less and includes at least one readily-oxidizing element selected from the group consisting of Al and Si in an amount of 0.15% by mass or more, and
 during the quenching treatment, a continuous layer of at least one selected from the group consisting of oxidized Al and oxidized Si is formed on the surface of the surface layer,
 after the quenching treatment, the surface layer is made from Zn as a major component, and the surface layer is formed of Fe: 30% by mass or less; and
 after the quenching treatment, the continuous layer of at least one selected from the group consisting of oxidized Al and oxidized Si is on the surface layer;
 said surface layer, after the quenching treatment, is made in an amount of 30 g/m² or more; and
 wherein the quenching treatment includes heating to a temperature in the range of 800° C. to 950° C.

2. The high-strength quenched formed body of claim 1, wherein the continuous layer present on the surface layer is oxidized Al.

3. The high-strength quenched formed body of claim 1, wherein the continuous layer present on the surface layer is oxidized Si.

4. A high-strength quenched formed body, comprising:
 a formed-body steel material coated with a surface layer, wherein the high-strength quenched formed body is obtained by quenching the surface layer and the formed-body steel material at the same time while the surface layer is present on the formed-body steel material;

wherein the surface layer, before the quenching, comprises Fe in an amount of 1% by mass or less and at least one readily-oxidizing element selected from the group consisting of Al and Si in an amount of 0.15% by mass or more, wherein during the quenching treatment, a continuous layer of at least one selected from the group consisting of oxidized Al and oxidized Si is formed on the surface layer, wherein the surface layer is present on the quenched formed-body steel material in an amount of 30 g/m$^2$ or more; and wherein the surface layer comprises Zn as a major component and Fe in an amount of 30% by mass or less based on the total weight of the layer; and wherein the quenching treatment includes heating to a temperature in the range of 800° C. to 950° C.

5. The high-strength quenched formed body of claim 4, wherein the continuous layer present on the surface layer is oxidized Al.

6. The high-strength quenched formed body of claim 4, wherein the continuous layer present on the surface layer is oxidized Si.

* * * * *